March 14, 1933.   C. S. REDFIELD   1,901,534
COMBINATION LUNCH BOX AND BOTTLE
Filed Jan. 23, 1932
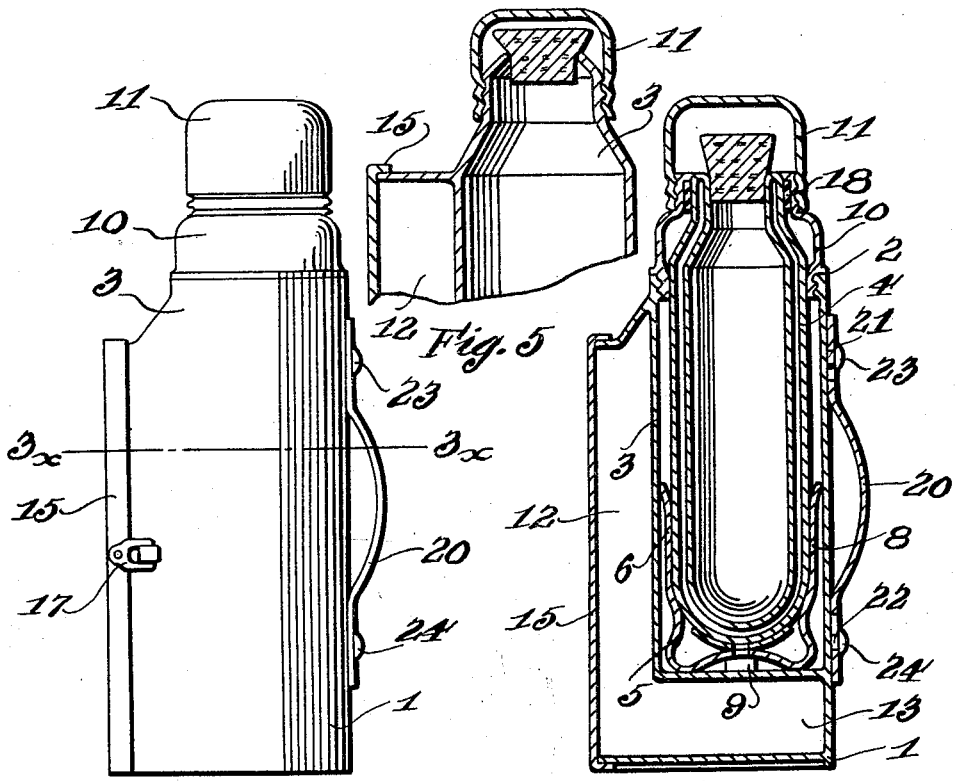
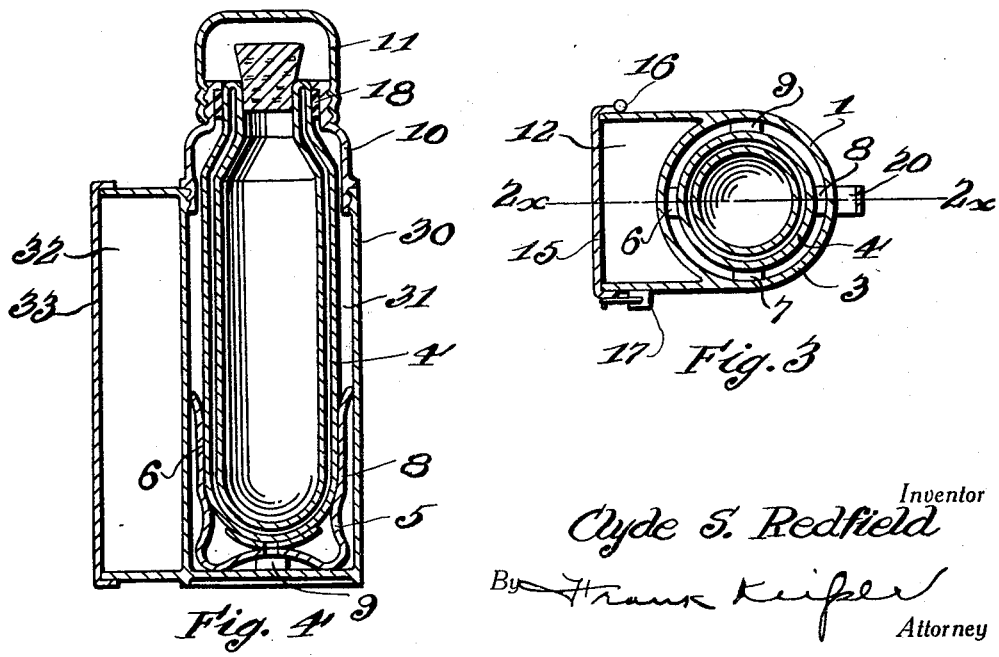
Inventor
Clyde S. Redfield
By Frank Keifer
Attorney Patented Mar. 14, 1933

1,901,534

UNITED STATES PATENT OFFICE

CLYDE S. REDFIELD, OF SHORTSVILLE, NEW YORK

COMBINATION LUNCH BOX AND BOTTLE

Application filed January 23, 1932. Serial No. 588,473.

The object of this invention is to provide a new and improved combination of bottle and lunch box, more especially a thermos bottle combined with a small lunch box, that is adapted to fit in an ordinary coat pocket, and will hold a small emergency lunch, together with milk or coffee etc. in the bottle.

These and other objects of the invention will be illustrated in the drawing, described in the specification, and pointed out in the claims at the end thereof.

In the drawing:

Figure 1 is a side elevation of the combination lunch box and bottle.

Figure 2 is a vertical section through the lunch box shown in Figure 1, the section being taken on the line 2x 2x of Figure 3.

Figure 3 is a horizontal section on the line 3x 3x of Figure 1.

Figure 4 is a section through a modified form of the lunch box.

Figure 5 is a detail view of that portion of the lunch box that contains the upper part of the cell, showing a modification thereof that would be made if the bottle were omitted and the liquid were contained directly in the cell.

In the drawing like reference numerals indicate like parts.

The box is preferably made of sheet metal and contains an outer casing 1, which at the top at one end is provided with a circular opening 2 having a cylindrical cell 3 depending therefrom. This cell is capable of holding the inside of a thermos bottle 4, and is supported therein by a stand 5 having four upright prongs 6, 7, 8 and 9. At the top, the circular opening is surrounded by a sleeve 10, which is threaded into the cell 3 at the top of the cell. The sleeve 10 has a thread at the top thereof with which the cap 11 makes threaded engagement.

Between the neck of the thermos bottle and the neck of the sleeve I provide a ring 18 of rubber as a packing between the two, which holds the neck of the thermos bottle firmly in place in the sleeve and prevents any liquid from running into the cell or receptacle when it is poured from the thermos bottle.

The lunch box extends downward below the cell 3 and out from one side thereof, and forms an L-shaped enclosure 12, the lower part 13 of which below the cell is adapted to hold an egg or similar article of food, and the long upright part of which at the side of the cell is adapted to hold one or two sandwiches. All this is enclosed in and forms a part of the outer casing 1. A door or lid 15, hinged at 16 on this casing, closes the opening 12 and is fastened in place by any suitable latch 17.

On the side of the casing opposite the door, I provide a handle 20 of leather or other flexible material that makes slotted engagement with the studs 21 and 22, and engages under the heads 23 and 24 of those studs, so as to maintain a sliding engagement therewith that will permit the handle 20 to flatten out against the casing when it is placed in the pocket.

In Figure 4 I have shown a modified form of the combination bottle and receptacle in which the casing 30 is provided with a cell 31 that is adapted to hold a thermos bottle. The casing extends laterally from this cell and forms a compartment 32 that is adapted to hold one or more sandwiches, as shown in cross section in Figure 3, but the compartment does not extend laterally under the bottle or the cell, as is shown in Figure 2. The compartment 32 is covered or closed by a lid 33, which is hinged on one side of the casing and clasped to the other side of the casing substantially as is shown in Figure 3.

It will also be understood that the bottle may be omitted, and that the cell which contains it may be lined with porcelain or granite coating, or the cell may be made of copper, or other metal that is suitable to hold liquid, and the liquid may be contained in the cell directly and may be poured or drunk therefrom.

I claim:

1. In a lunch box the combination of a cell on one side thereof adapted to hold a round bottle, an opening on the end of said cell, the mouth of said bottle extending through said opening and being adapted to receive a cork therein, a screw cap on the outside of the box for closing the end of said cell, said box having a compartment at one side and at the bottom of the cell adapted to hold solid foods, an opening in the side of the box, a door adapted to close said opening, said door extending parallel to the axis of the round bottle adapted to be held by the cell.

2. In a lunch box the combination of a cell on one side thereof adapted to hold a round bottle, said box having a compartment at the side and bottom of said cell, said compartment being adapted to hold solid foods, an opening in the side of the box, a door adapted to close said opening, a sleeve threaded to the upper end of said cell, a bottle in said cell, an annular packing between said sleeve and the rim of said bottle, a cap threaded on the end of said sleeve from the outside of the box.

3. In a lunch box the combination of a cell on one side thereof adapted to hold a round bottle, an opening on the end of said cell, the mouth of said bottle extending through said opening and being adapted to receive a cork therein, a screw cap on the outside of the box for closing the end of said cell, said box having a compartment at the side of said cell, said compartment being adapted to hold solid foods, said box being rectangular on three sides thereof and being semi-cylindrical in shape on the fourth side thereof.

4. In a lunch box the combination of a cylindrical cell on one side thereof closed on the end with a cap outside of the box, said box having a compartment at the side of said cell, said compartment being adapted to hold solid foods, said box being rectangular on three sides thereof and being semi-cylindrical in shape on the fourth side thereof.

In testimony whereof I affix my signature.

CLYDE S. REDFIELD.